United States Patent [19]

Worby

[11] 4,447,194

[45] May 8, 1984

[54] METHOD OF MANUFACTURING A FUEL PUMP

[75] Inventor: Donald Worby, Kings Stanley, England

[73] Assignee: Lucas Industries Plc, Birmingham, England

[21] Appl. No.: 395,676

[22] Filed: Jul. 6, 1982

[30] Foreign Application Priority Data

Jul. 21, 1981 [GB] United Kingdom ................. 8122419

[51] Int. Cl.$^3$ ........................ F16J 10/02; F02M 59/44

[52] U.S. Cl. ............................ 417/572; 29/156.4 WL; 92/171; 417/490

[58] Field of Search ............... 417/490, 494, 499, 572; 92/169, 171, 165 PR; 123/446, 495; 29/156.4 WL

[56] References Cited

U.S. PATENT DOCUMENTS 2,975,776 3/1961 Nicolls ................................ 123/495

3,251,279 5/1966 O'Brien ............................ 92/169 X

FOREIGN PATENT DOCUMENTS 1204025 10/1965 Fed. Rep. of Germany ... 92/165 PR

*Primary Examiner*—Leonard E. Smith

[57] ABSTRACT

A method of manufacturing a fuel injection pump includes the step of broaching a bore in a pump body to accomodate a cylindrical pump barrel. The broached bore is of non-circular section and has at least three flat sides which contact the cylindrical surface of the barrel. In addition the broached bore defines a tongue which locates in a groove in the barrel to prevent rotation of the barrel in the body.

5 Claims, 2 Drawing Figures

FIG. 1.
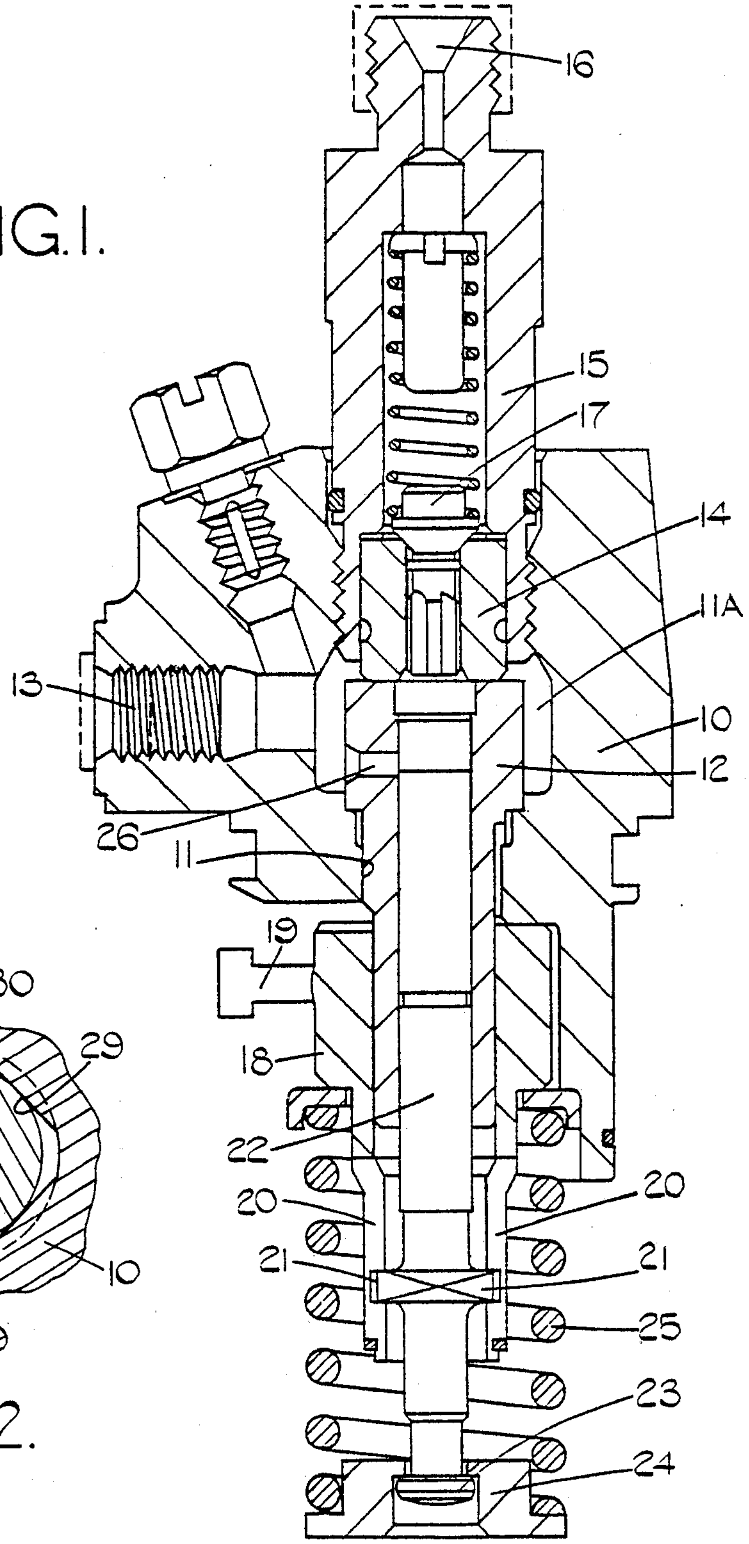
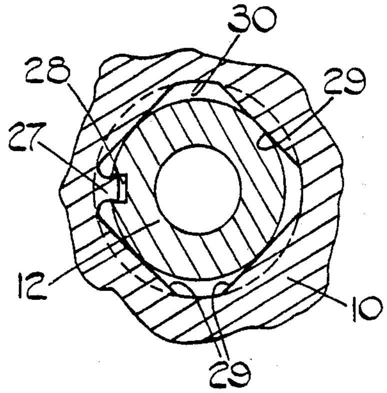
FIG. 2.

METHOD OF MANUFACTURING A FUEL PUMP

This invention relates to a method of manufacturing a fuel injection pump of the kind comprising a pump body, a cylindrical flanged pump barrel mounted within a bore in the body and a plunger reciprocably mounted within a further bore defined in the barrel, the pump barrel being retained against a step defined in the body by means of a part carried by the pump body which engages in sealing relationship, an end surface of the barrel.

Such pumps are well known in the art and for various reasons it is necessary to correctly position the barrel within the body and to retain it against angular movement particularly whilst said part is being secured in position.

The pump barrel is provided with a longitudinal groove in its side surface and in the past it has been the practice to provide a pin projecting from the surrounding wall of the bore in the body, the end portion of the pin extending into said groove to provide the required location of the barrel. It has been the practice to mount the pin in an aperture drilled in the body, the mounting of the pin involving additional machining operations.

The object of the present invention is to provide a method of manufacturing a pump of the kind specified in a simple and convenient form.

According to the invention a method of manufacturing a fuel injection pump of the kind specified comprises broaching said bore to non-circular form, the broach being shaped so that the broached bore has at least three substantially flat sides for engagement with the peripheral surface of the pump barrel, said broach also being shaped to provide a tongue in the bore.

An example of a fuel injection pump constructed in accordance with the invention will now be described with reference to the accompanying drawings in which:

FIG. 1 is a sectional side elevation of the completed pump; and

FIG. 2 shows a section through a part of the pump.

Referring to the drawings, the pump comprises a body 10 in which is defined a stepped bore 11 having an enlarged portion 11A which with a flanged pump barrel 12, defines a fuel chamber to which fuel is supplied through a fuel inlet 13 formed in a lateral extension of the body.

The pump barrel has a flanged upper portion which locates against a step defined in the bore 11, the barrel being urged into engagement with this step by the abutment with the end surface of the barrel, of a delivery valve housing 14, the latter being held in position by a plug 15 which defines a fuel outlet 16. The delivery valve housing 14 mounts a spring loaded delivery valve body 17.

The pump barrel is cylindrical and extends beyond the bore to define a cylindrical surface about which is located a sleeve 18 having a radial peg 19 whereby the angular setting of the sleeve can be varied. The sleeve defines a pair of longitudinal slots 20 within which are located ears 21 formed on a pump plunger 22 which is slidable within a bore in the barrel. The end of the plunger is provided with a head 23 with which is engaged a spring abutment 24 against which locates a coiled compression spring 25 acting in use to urge the plunger 22 out of the bore in the barrel. The pump is designed to be mounted in a housing which includes a cam shaft arranged to impart inward movement to the plunger.

In known manner the pump barrel is provided with a spill port 26 which communicates with the fuel chamber and which can be uncovered to a helical groove (not shown) formed in the plunger, at some point during the inward movement of the plunger by the cam. The instant at which the groove communicates with the port 26 to terminate delivery of fuel depends upon the angular position of the plunger and this is determined by the angular position of the sleeve 18. The peg 19 is connected to adjusting mechanism in known manner whereby the angular setting of the plunger can be varied.

In order to ensure that the port 26 is in the correct position during assembly of the pump, it is necessary to provide a location for the pump barrel to prevent it moving angularly particularly whilst the delivery valve housing is being tightened into position.

In the past it has been the practice to provide a longitudinal groove in the cylindrical surface of the pump barrel and to provide a pin which is located in a drilling in the body 10 and which extends into the groove.

Turning now to FIG. 2, the proposed method of location of the barrel is by means of a tongue 27 which locates within a groove 28 formed in the barrel. It is proposed to broach the portion of the bore 11 which lies below the flange of the barrel 12. The broached portion of the bore does, however, have a special shape and it will be seen from FIG. 2 to define four substantially flat sides 29 which are positioned about the longitudinal axis of the barrel and which engage with the cylindrical surface of the barrel to provide the required location. Relative angular movement of the pump barrel and of the body is of course prevented by the tongue and groove connection. It will be noted from FIG. 2 that three of the sides 29 are joined by arcuate wall portions indicated at 30 and the fourth section defines the tongue.

The broach which is utilized to form the bore is initially of cylindrical form having a diameter corresponding to the portions 30. The dotted outline in FIG. 2 represents the initial diameter of the broach. In modifying the broach flats are machined thereon equivalent to the sides 29 and in addition, a groove is formed which when the broach is completed, will form the tongue 27. The broach is also shaped to define radii between the tongue 27 and the adjacent sides 29. The broach is easy to produce and furthermore is easy to resharpen when required.

It will be understood that the bore may have three flat sides instead of four, three being the minimum number to achieve the desired location of the barrel.

What is claimed is:

1. A method of manufacturing a fuel injection pump of the kind comprising a pump body, a cylindrical flanged pump barrel mounted within a bore in the body and a plunger reciprocably mounted within a further bore defined in the barrel, the pump barrel being retained against a step defined in the body by means of a part carried by the pump body which engages in sealing relationship, an end surface of the barrel, characterized in that the bore in the pump body is formed by a broaching operation, the broached bore having a non-circular form, the broach being shaped so that the broached bore has at least three substantially flat sides for engagement with the peripheral surface of the pump barrel, said broach also being shaped to provide a tongue in the bore.

2. A method of manufacturing a fuel injection pump according to claim 1 in which said tongue is disposed intermediate adjacent ends of a pair of said sides.

3. A fuel injection pump comprising a pump body, a cylindrical flanged pump barrel mounted within a bore in the body and a plunger reciprocably mounted within a further bore defined in the barrel, the pump barrel being retained against a step defined in the body by means of a part carried by the body which engages in sealing relationship, said bore having a non-circular form with at least three substantially flat sides for engagement with the peripheral surface of the barrel, a longitudinal tongue in the bore and a groove on said barrel for engagement with said tongue to prevent angular movement of the barrel within the bore.

4. A pump according to claim 3 in which said flat sides of the bore are interconnected by arcuate wall portions.

5. A pump according to claim 4 in which said tongue is disposed between adjacent ends of a pair of said sides.

* * * * *